Nov. 29, 1966 J. E. BARR ETAL 3,289,083

FREQUENCY SHIFT KEYED DATA TRANSMISSION SYSTEM

Filed May 28, 1963 3 Sheets-Sheet 1

INVENTORS
JOSEPH E. BARR
HARRY C. KUNTZLEMAN
HENRY A. REITFORT

BY [signature]

AGENT

Nov. 29, 1966 J. E. BARR ETAL 3,289,083

FREQUENCY SHIFT KEYED DATA TRANSMISSION SYSTEM

Filed May 28, 1963 3 Sheets-Sheet 2

United States Patent Office 3,289,083

Patented Nov. 29, 1966

3,289,083

FREQUENCY SHIFT KEYED DATA TRANSMISSION SYSTEM

Joseph E. Barr, Endicott, Harry C. Kuntzleman, Newark Valley, and Henry A. Reitfort, Vestal, N.Y., assignors to International Business Machines Corporation, New York, N.Y., a corporation of New York Filed May 28, 1963, Ser. No. 283,871
4 Claims. (Cl. 325—59)

Figure 1A:
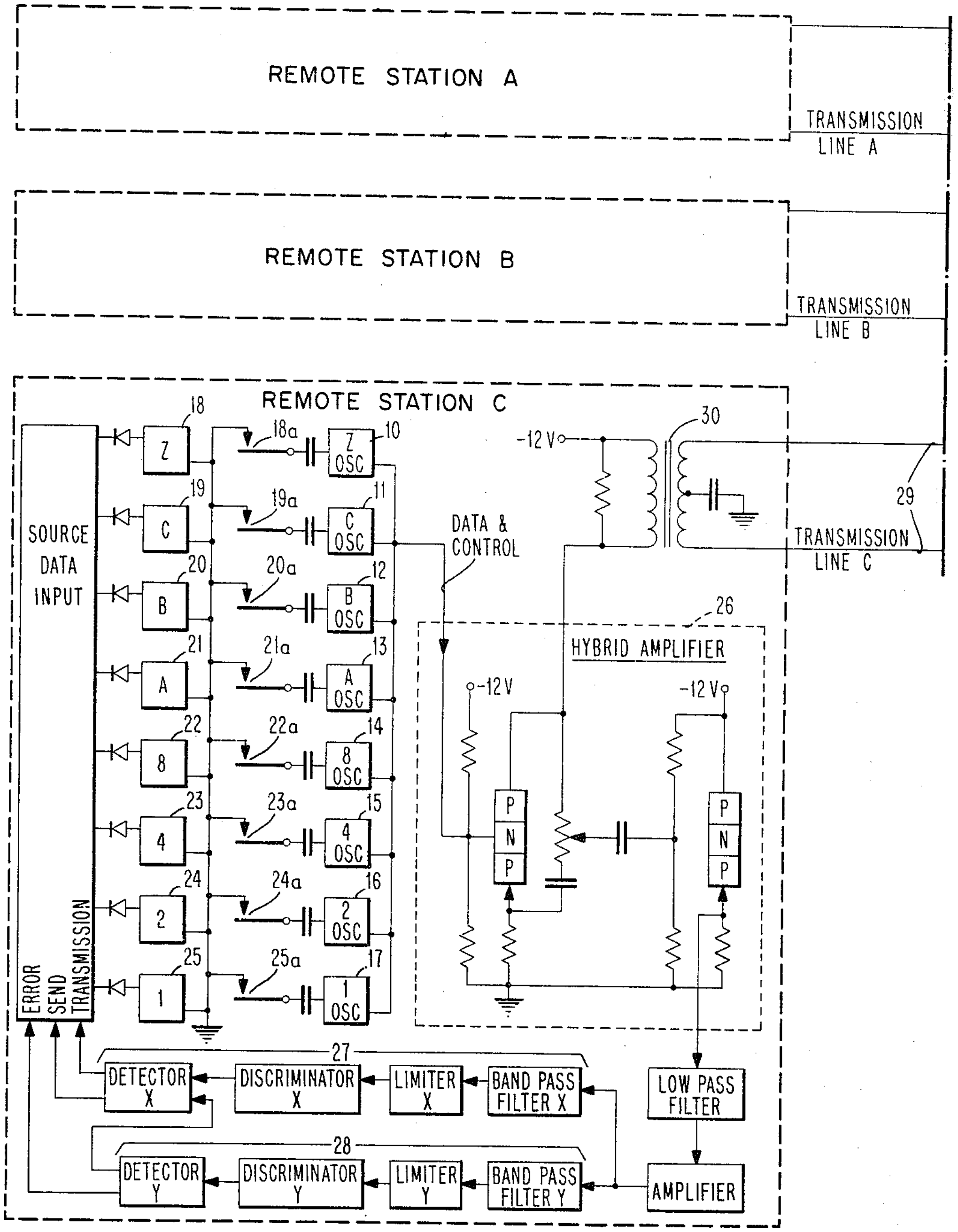

This invention relates to data transmission and more particularly to a new and novel analog FSK (frequency shift keyed) data transmission system.

A wide variety of data processing equipment is currently being used and developed by numerous business concerns. Source data, which is generated at remote points, has to be transmited to a central point to enable the data processing operations. Private wire and telephone services are frequently employed for this data transmission. Current telephone systems are limited as to band width and the number of channels that can be transmitted on conductors. Serial systems are more limited than parallel systems since a single conductor is employed. Parallel systems are quite complex and require several conductors. Data to be transmitted is converted to bit representations.

The speed of transmission is important in many applications. Accordingly, the number of bits a system can handle per given unit of time is often quite important. Information may be transmited by telephone facilities or a group of wires by assigning one digit to each wire, and this is known as parallel transmission. Or the various characters may be assigned to successive ordered pulses on a single wire and this is called serial transmission. These systems usually require synchronizing means, timing data, and where successive digits are transmitted serially, the start of a sequence is usually identified by some auxiliary information. Other auxiliary information is sometimes needed for error checking to preclude impairment of the data transmitted.

It is a principal object of the present invention to provide an inexpensive data transmission system using simple circuitry for taking advantage of the reduced complexity and cost of a single pair of conductor transmission systems, while being capable of transmitting data more rapidly than serial conductors have heretofore been able to transmit them.

Another object of the invention is to provide the data transmission system transmitting on a standard telephone voice channel with a high degree of noise immunity.

Still another object of the invention is to provide a data transmission system with full duplex control and half duplex data transmission.

It is still a further object of the present invention to provide a data transmission system with an FSK control means of scanning the remote data terminals.

A further object of the invention is to provide an FSK means of controlling the transmission of data from a plurality of remote terminals to a central terminal.

It is a further object of the present invention to provide an FSK system having substantial frequency stability.

Briefly described, the present invention is for a data transmission system in which the data transmission is half duplex with full duplex control and is serial by character, parallel by bit. The system comprises a plurality of remote terminal stations and a central station including means for selectively scanning each of the remote stations. Each of the remote stations includes a transmitting section having a plurality of oscillators with means of frequency shift keying the oscillators for the purpose of transmitting data and control information, and a receiving section for receiving control information from the central station. Each of the remote stations is coupled to the central station through a pair of telephone lines. The central station includes receiving means for receiving and decoding data and control information scanning means responsive to control information for selectively scanning the remote stations for information to be transmitted to the central station, and means for transmitting control information.

The foregoing and other objects, features and advantages of the invention will be apparent from the following more particular description of a preferred embodiment of the invention, as illustrated in the accompanying drawings.

Figure 1B:
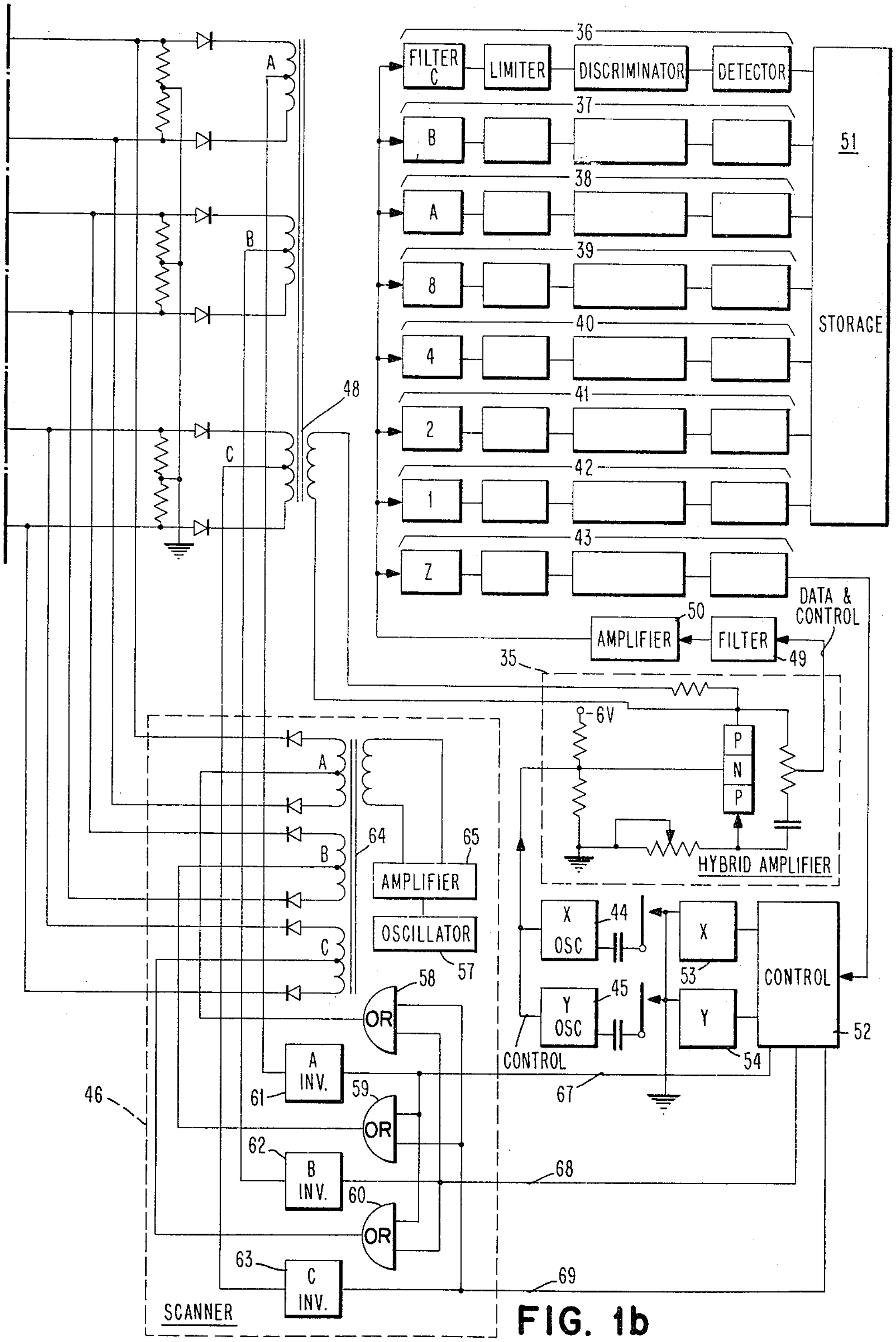

FIGS. 1*a* and 1*b* placed side by side with FIG. 1*a* to the left, is a schematic block diagram of a preferred embodiment of the invention for an FSK data transmission system.

Figure 2:
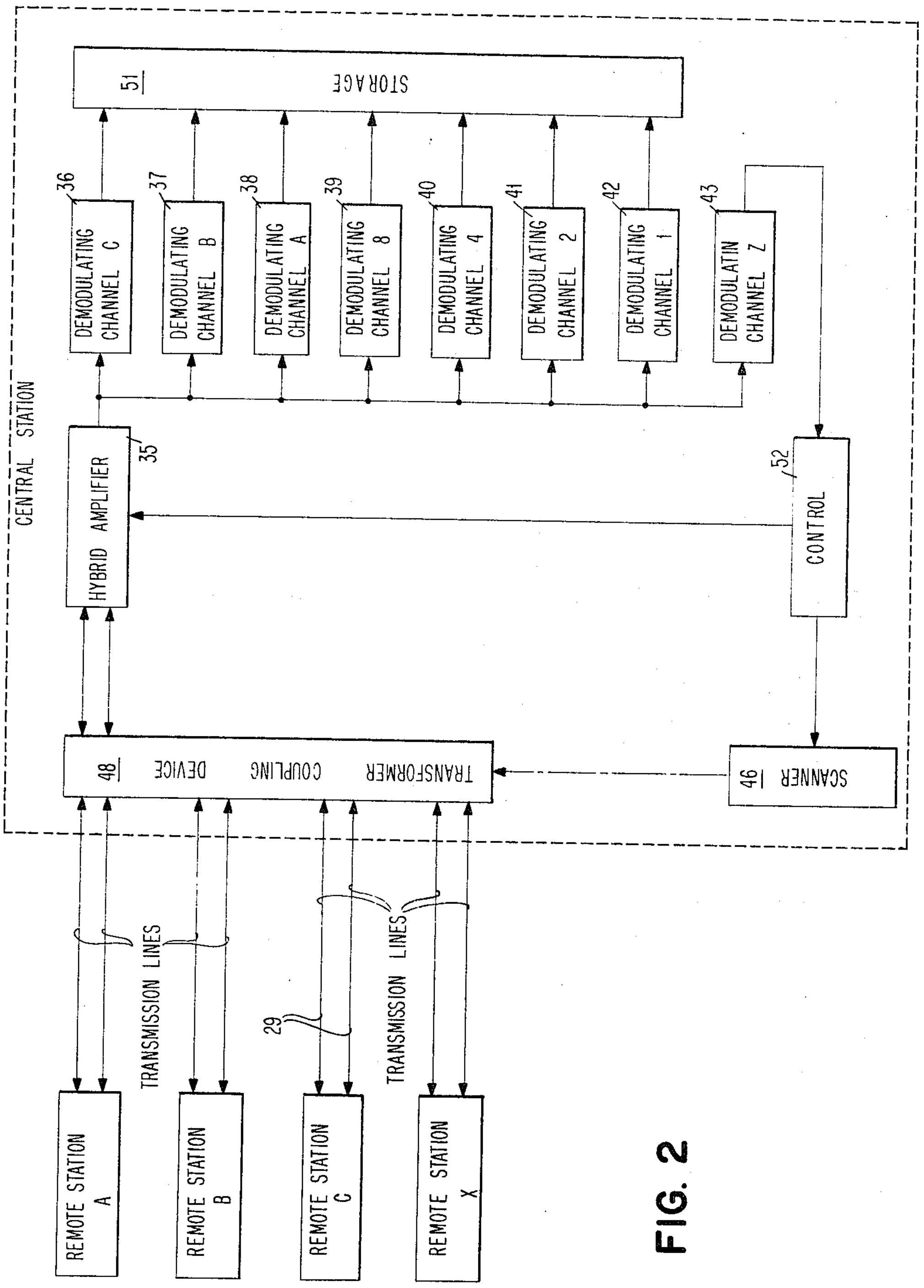

FIG. 2 is a schematic block and flow diagram of a FSK Data Transmission System according to the preferred embodiment of the invention shown in FIGS. 1*a* and 1*b*.

Referring to FIGS. 1*a* and 1*b*, there is shown a schematic block diagram of a data transmission system according to the invention. While we have arbitrarily chosen to show three remote stations diagrammatically, it should be understood that the system is capable of handling many more remote stations. The transmission of data information is half duplex and the transmission of control information is full duplex in a serial-by-character, parallel-by-bit mode of operation.

The remote station comprises 8 frequency shifting oscillators 10–17 to accommodate the 7-bit BCD (binary coded decimal) data code and 1 control bit, 8 control relays 18–25 for effecting the frequency shifting of the oscillators 10–17, a hybrid amplifier 26, a coupling transformer 30, and 2 control frequency receiver channels 27 and 28. Each of the frequency shifting oscillators is free-running at a fixed predetermined frequency and adapted to be down-shifted bq 100 c.p.s. (cycles per second) to represent a "1" bit for the particular data bit or control bit channel. The downshifting is accomplished by inserting a capacitor across the tank circuit of the oscillator. In the preferred embodiment of the invention, the high frequency of a channel is separated from the low frequency of the next higher channel by 150 c.p.s. as indicated in the following table:

| | | C.p.s. |
|---|---|---|
| Data bits: | | |
| 1 | f1 | 800 |
| | f2 | 900 |
| 2 | f1 | 1050 |
| | f2 | 1150 |
| 4 | f1 | 1300 |
| | f2 | 1400 |
| 8 | f1 | 1550 |
| | f2 | 1650 |
| A | f1 | 1800 |
| | f2 | 1900 |
| B | f1 | 2050 |
| | f2 | 2150 |
| C | f1 | 2300 |
| | f2 | 2400 |
| Control bits: | | |
| Z | f1 | 2550 |
| | f2 | 2650 |
| X | f1 | 300 |
| | f2 | 400 |
| Y | f1 | 550 |
| | f2 | 650 |

Thus, it may be noted that data bits and the control bit assigned for use by the remote stations have a frequency range of from 800 c.p.s. to 2650 c.p.s. A character signal output of the oscillators in the remote station is an A.C. signal having a composite waveform which is coupled through the hybrid amplifier 26 and a coupling transformer 30 to a transmission line 29.

While the preferred embodiment of the invention is being described with reference to specific frequencies, we do not wish to be limited thereto, for obvious modifications will occur to those skilled in the art without departing from the spirit of the invention.

The control relays 18 through 25 are adapted to respond to source data input devices such as card readers, badge readers, tape readers, keyboard entry devices or switch devices, which may or may not be remotely located relative to the remote station controls, and wherein contact closures serve to energize one or more of the control relays 18 through 25 selectively to thereby effectively cause a shift in frequency of the associated oscillators 10 through 17. The energizing of any given relay will close the related *a* contact points thereby placing a capacitor across the tank circuit of the associated oscillator.

The hybrid amplifier 26 includes a transistorized signal amplifier provided with impedance matching characteristics and is connected with a transformer coupling device 30 for coupling the hybrid amplifier output signal with the transmission line 29. The hybrid amplifier 26 functions to pass the output bit representing signals from the oscillators 10 through 17 to the transmission line 29 with a minimum attenuation and to receive control signals from the transmission line 29 and pass them to the control frequency receiver channels 27 and 28 with a minimum attenuation. The receiver channels 27 and 28 function to demodulate the X and Y control bit signals transmitted from the central station for application to the control circuitry within the remote station. The particular need for the demodulating circuitry will become more fully apparent as the description proceeds.

The central station comprises a transformer coupling device 48, a hybrid amplifier 35, 8 bit signal demodulating channels 36 through 43, 2 frequency shift keyed oscillators 44 and 45, and a remote station scanner control 46.

The hybrid amplifier 35 includes transistorized signal amplifying means which is connected with the transformer coupling means 48 for coupling the transmission lines with the hybrid amplifier 35. The coupling transformer 48 includes a primary winding and a plurality of D.C. biased secondary windings, one for each of the data transmission lines coupled to a remote station. The hybrid amplifier 35 is coupled with a band pass filter 49 adapted to accommodate a frequency range of from 800 c.p.s. to 2650 c.p.s., this being the frequency range of the character bits and the Z control bit representing signals from the remote stations. The output of the band pass filter 49 is passed through a signal amplifier 50 having its output coupled to a plurality of bit signal demodulating channels 36 through 43, one for each of the character bit representing signals and the Z control bit representing signal. Each of the demodulating channels 36 through 43 includes a filtering circuit means, a limiting circuit means, a discriminator circuit means, and a detecting circuit means. The outputs for the character bit representing detectors of the demodulating channels 36 through 42, are coupled to the input of bit signal storage means 51. The Z control bit demodulating channel 43 is adapted to accommodate the Z control bit frequency of 2550 c.p.s. with the detector output for the Z control bit representing signal being coupled to a control apparatus 52. The Z control bit frequency is intentionally selected from the high end of the frequency range because of the more desirable speed characteristics for the control function.

The control apparatus 52 serves to control the X and Y control bit relays 53 and 54 which, in turn, control the frequency shift keying of the X and Y control bit oscillators 44 and 45. The A.C. signal outputs from the X and Y control bit oscillators 44 and 45 are coupled to the hybrid amplifier 35 for transmission to the data transmission lines by way of the coupling transformer 48. These signals function to operate the control circuits at the remote station and control the transmission of data from the remote station. The control apparatus 52 also switches the biasing signals for the scanner biasing control in a manner now to be described.

The scanner biasing control comprises three OR circuit configurations 58, 59 and 60 and three inverter stages 61, 62 and 63. The biasing control circuits serve to control the secondary windings of the scanner coupling transformer 64 and the coupling transformer 48 by forward biasing selected secondary windings while reverse biasing the remaining secondary windings. Biasing of the secondary windings of the coupling transformers 48 and 64 is effected through the medium of a gated pulsing ring circuit in the control apparatus 52 which sequentially applies a positive D.C. pulse to lines 67, 68, and 69. These lines are normally biased slightly negative with reference to ground. The positive pulse when applied to one of the lines, as for example, line 69 will pass through the inverter 63 with the negative pulse output serving to forward bias the C winding of coupling transformer 48. This is due to the manner in which the diodes in the secondary windings of the coupling transformer 48 are polarity oriented. The positive pulse applied to line 69 will also pass through the OR circuits 58 and 59 for coupling to the A and B windings of transformer 64. The application of positive pulses to the A and B windings will cause these windings to be forward biased. The forward biasing of the A and B windings of coupling transformer 64 by the application of a positive pulse is due to the manner in which the diode in the secondary windings are polarity oriented. This permits the output A.C. signal from the fixed frequency oscillator 57 to pass through the amplifier 65 for application to the primary windings of the coupling transformer 64 with the resultant output on the A and B secondary windings serving to hold the A and B remote stations, respectively, in a captured status while the C remote station is being sensed for a "request send," which is a Z bit control signal from the remote station. The receipt of a Z bit control signal station will gate the ring circuit in the control apparatus 52 thereby holding the biasing control of the scanner 46 in a locked condition. In accordance with the illustrative example of biasing control, if the remote station C sends a Z bit control signal, the biasing control will be held in the locked condition. This permits the A.C. signals for the control bits and data bits to be transmitted between the central station and the selected remote operating station.

The operation of the system will probably be best understood from the description of an illustrative example. We may arbitrarily assume that remote station C (FIG. 1*a*) is desirous of sending data to the central (FIG. 1*b*), and accordingly the operator will actuate the appropriate control key at the remote station. This will cause Z control bit, relay 18 to be energized and threby cause the Z control bit oscillator 10 to downshift its frequency. The output signal from the Z control bit oscillator 10 will be passed through the hybrid amplifier 26 and the coupling transformer 30 for transmission via transmission line 29 to the central station. At the central station the received Z control bit signal will be passed through the coupling transformer 48 and the hybrid amplifier 35, filter 49 and amplifier 50 and then fed to the input of the Z bit demodulating channel 43. The output of the Z bit demodulating channel 43 will be fed to the control apparatus 52. The control apparatus 52 will deactivate the scanner 46 for the purpose of back biasing the A and B windings of the coupling transformer 48 and appropriately forward biasing the C winding of the coupling transformer 48. This will enable the transmission of the A.C. data and control bit signals between the central station and the remote station C, while preventing the transmission of A.C. signal between the central and the other remote stations. The control apparatus 52 in the central station will activate the X and Y control bit oscillators 44 and 45 for transmitting appropriate control signals through the hybrid amplifier 35 and the coupling transformer 48 to enable transmission with the remote station C via the transmission lines 29. The received control signals will pass through the remote station C coupling transformer 30 and the hybrid amplifier 26 and into the X and Y control bit receiver-demodulator channels 27 and 28 of the remote station. The output of the receiver-demodulator channels 27 and 28 of the remote station will advise the operator at the remote station if the central station is ready to receive data.

Assuming that conditions are proper for the transmission of data, the operator will initiate an input of source data which will be performed in a serial by character manner. The character reading will actuate the appropriate character bit representing relays 19 through 25 in a selective manner, which will, in turn, down shift the corresponding character bit oscillators 11 through 17. The output from the character bit oscillators 11 through 17 will form a composite A.C. waveform having character significance.

Data will be transmitted in a serial-by-character and parallel-by-bit mode of operation. Each character representing signal received at the central station will be passed through the coupling transformer 48, the hybrid amplifier 35, the filter 49, and the amplifier 50 and to the demodulating channels 36 through 42 for decoding and coupling the bit representing signals into the bit storage positions of the storage apparatus 51. Thus, it has been illustrated how a data transmission operation is initiated and the transmission of data is effected.

The data transmission system herein described offers numerous advantages over previous methods for transmitting data. It may be noted that the disclosed system provides an FSK narrow bandwidth half duplex data transmission with full duplex control. The remote terminals initiate a message transmission request which is acknowledged under control of the central station. Each remote station is adapted to handle a plurality of input devices on a time shared basis. Requests of the individual input devices for transmission service are stored at the remote terminal. The request or message transmission is initiated at the remote terminals and the request will be acknowledged under control of the central station. The central station is adapted to receive data from a plurality of remote stations with the data transmission from the remote stations being selectively controlled by means of the scanner located at the central station. The scanner control at the central station is adapted to operate at electronic speeds. Furthermore, the scanner controls operate to minimize the interference of data and control signal feedbacks. The central control scanner provides leads to capture the non-transmitting remote stations when one of the remote stations may be in a data transmitting mode of operation.

While the invention has been particularly shown and described with reference to a preferred embodiment thereof, it will be understood by those skilled in the art that various changes in form and details may be made therein without departing from the spirit and scope of the invention.

What is claimed is:

1. A data communication system comprising:

(a) a plurality of remote data stations;

(b) a central data station;

(c) transmission line means coupling each of said remote data stations with said central data station;

(d) oscillator means at each of said remote data stations for generating a frequency control signal and transmitting same to said central data station;

(e) means at said central data station responsive to a frequency control signal for selecting the remote data station whose control signal was transmitted;

(f) frequency control signal generating means at said central data station responsive to the frequency control signal from a remote station for transmitting to the operative remote data station a send data frequency control signal;

(g) means at the operative remote data station responsive to the send data frequency control signal for initiating a data transmission operation;

(h) source data reading means at said operative remote data station being responsive to the send data control signal to enable data reading operations;

(i) a plurality of frequency signal generating means responsive to the source data reading means for generating character representing frequency signals according to a predetermined code configuration for transmission to said central data station via one of said transmission lines;

(j) means at said central data station for receiving the coded frequency signals and decoding them; and (k) means for storing the decoded data representing signals.

2. A data communication system comprising:

(a) a plurality of remote stations;

(b) a central station;

(c) transmission means coupling each of said remote stations with said central stations;

(d) each of said remote stations including source data input means; a plurality of oscillators, one for each of the elements of a predetermined code configuration, and a control signal oscillator, each of the oscillators adapted to generate signals of preassigned frequency value; means associated with each of said oscillators and responsive to the source data input means for abruptly shifting the frequency of selected oscillators by a fixed constant amount; means commonly coupling the outputs of said oscillators to provide composite character representing frequency signals for transmission to the central station; transformer coupling means for coupling the character representing frequency signals with the transmission coupling means; and control signal receiving and decoding means; and (e) said central station including signal amplifying means; transformer coupling means for coupling the signal amplifying means with the transmission coupling means; a plurality of decoding channels for separating data character representing frequency signals transmitted from a remote station into code element frequency signals; a decoding channel for control signals transmitted from the remote station; storage means for storing the code element representation of data signals; a control signal oscillator for generating control signals to be transmitted to a remote station; control apparatus responsive to a control signal and serving to abruptly shift the frequency of the control signal oscillator for transmitting a control signal to a remote station; scanner means under control of said control apparatus for controlling said transformer coupling means.

3. A data communication system comprising:

(a) a plurality of remote stations;

(b) a central station;

(c) transmission means coupling each of said remote stations with said central stations;

(d) source data input means at each of said remote stations;

(e) a plurality of oscillators at each of said remote stations, one for each of the elements of a predetermined code configuration, a control signal oscillator, each of the oscillators being adapted to generate signals of preassigned frequency value;

(f) means associated with each of said oscillators and responsive to said source data input means for abruptly shifting the frequency of selected oscillators by a fixed constant amount;

(g) means commonly coupling the outputs of said oscillators to provide composite character representing frequency signals for transmission to the central station;

(h) transformer coupling means for coupling the character representing frequency signals with the transmission coupling means;

(i) control signal receiving and decoding means at each of said remote stations;

(j) a plurality of decoding channels at said central station for separating data character representing frequency signals transmitted from a remote station into code element frequency signals;

(k) a decoding channel at said central station for control signals transmitted from the remote station;

(l) transformer coupling means for coupling transmission coupling means with said decoding channels;

(m) storage means for storing the code element representation of data signals;

(n) control signal oscillators for generating control signals to be transmitted to a remote station;

(o) control apparatus responsive to a control signal and serving to abruptly shift the control signal oscillators for transmitting control signals to a remote station; and (p) scanner means under control of said control apparatus for controlling said transformer coupling means at said central station.

4. In a frequency shift keying data communication system, the combination, comprising:

(a) a plurality of remote stations;

(b) a central station;

(c) transmission lines coupling each of said remote stations with said central station;

(d) signal generating means at each of said remote stations for producing binary signals having initial frequency allocations;

(e) relay switching means for selectively and abruptly shifting the frequency of the signal generating means by a fixed amount to produce the binary representations of data and control signals;

(f) transformer means for coupling the data and control signals to a station coupling transmission line;

(g) signal demodulating means at the central station for selectively identifying the data and control signals transmitted from the remote station;

(h) transformer means including a plurality of secondary windings for coupling of said remote stations with said signal demodulating means;

(i) control apparatus at the central station responsive to a control signal transmitted from a remote station to operatively engage the central station with a transmitting remote station by way of selected secondary winding of the transformer means at said central station to permit the transmission of data signals; and (j) storage means at the central station for storing the data signals transmitted from the remote station.

References Cited by the Examiner

UNITED STATES PATENTS

| | | | |
|---|---|---|---|
| 2,903,517 | 9/1959 | Ridings | 179—2 |
| 3,046,340 | 7/1962 | Stoffels | 179—3 |

DAVID G. REDINBAUGH, *Primary Examiner.*

J. T. STRATMAN, *Assistant Examiner.*